United States Patent Office 3,525,701
Patented Aug. 25, 1970

3,525,701
OXIDATION CATALYST OF AN OXIDE COMPOSITION OF ANTIMONY, TIN AND COPPER
John Lynn Barclay, Tadworth, Surrey, and Edward James Gasson, Epsom Downs, Surrey, England, assignors to The Distillers Company Limited, Edinburgh, Scotland, a British company
No Drawing. Filed Mar. 1, 1965, Ser. No. 436,361
Claims priority, application Great Britain, Mar. 21, 1964, 12,048/64
Int. Cl. B01j *11/06, 11/40*
U.S. Cl. 252—461                               5 Claims

ABSTRACT OF THE DISCLOSURE

Catalytic oxide compositions of antimony, tin, and copper. The catalytic composition is prepared by co-precipitation of heat-decomposable compounds of antimony, tin and copper by addition of an alkaline material to an aqueous solution of the mixed salts of said metals, and recovering the mixed precipitate which is dried and calcined. These catalytic compositions are useful in oxidation reactions.

---

The present invention relates to a catalytic composition and in particular to a catalytic composition for use in oxidation reactions.

Accordingly the present invention is a catalytic composition for catalysing oxidation reactions of organic compounds at an elevated temperature in the vapour phase which comprises an oxide composition containing antimony and tin together with copper and/or chromium and/or manganese.

The catalyst is an oxide composition which may comprise an admixture of the oxides of antimony, tin and the other metal or metals, or an oxygen-containing compound or compounds of antimony, tin and the other metal or metals; under the reaction conditions the composition may exist in either or both forms.

The proportions of the various components of the catalyst may vary within moderately wide limits. The atomic ratio of antimony/tin can be for instance from 1:10 to 10:1. The amount of copper, chromium, and/or manganese present is not critical, and may vary between about 0.5% and about 30% molar based on the total composition. By the expression "percentage molar" or more correctly speaking in most instances "percentage atomic" is meant the atomic weight of the metal concerned expressed as a percentage of the sum of the atomic weights of antimony plus tin plus the particular metal concerned. Concentrations between 1% and 15% are particularly preferred in catalysts which contain antimony and tin in the atomic ratio between about 6:1 and 2:1. A catalyst which is an oxide composition containing antimony, tin and copper is preferred.

In preparing these catalysts it is particularly preferred to ensure that the mixed oxide composition before being dried or heat-treated, contains neither acids nor bases, free or combined, which might be capable of further reaction with a portion of the additional metal or metals to form a soluble compound, during further processing. Any such acidic or basic materials present in the composition may be removed by either extended washing with hot water, or by forming a slurry with water and adjusting the pH to about 7 and filtering or centrifuging.

The oxide composition catalysts may be prepared in various ways. For instance, the antimony, tin and additional metal or metals may be co-precipitated from a mixed aqueous solution of their soluble salts, for example the chlorides. In this case the precipitation of the hydroxides is carried out by addition of ammonia. The precipitate is then thoroughly washed with water to remove soluble salts, for example ammonium chloride.

Alternatively, an antimony/tin oxide composition may first be prepared, and the additional metal or metals subsequently incorporated. The antimony/tin oxide composition may be prepared by co-precipitation as before, or by intimately mixing one or more oxides of antimony such as the trioxide, tetroxide, or pentoxide, or a hydrated oxide, with one or more hydrated oxides of tin. Mixtures of the hydrated oxides, formed for example by the action of aqueous nitric acid on antimony and tin metals, or on mixtures of the metals, are preferred. The additional metal or metals may then be added to the mixture, for instance as an insoluble neutral compound which is convertible to the oxide on heating. Examples of such insoluble neutral compounds are the hydroxides, carbonates, and hydrated oxides.

Alternatively the additional metal or metals may be added to the antimony/tin oxide composition in the form of a soluble salt, such as a nitrate, formate, acetate, chloride or sulphate, and the mixture then neutralised with a base such as ammonia to precipitate the oxide.

After mixing the oxides, the composition is subjected to a heat treatment in molecular oxygen, for instance at a temperature in the range 550° C. to 1100° C., and preferably between 700° C. and 850° C. It is preferred to raise the temperature of the mixture at a controlled rate, for example within the range 5–50° C. per hour. The time of heating at the final temperature is not critical and may be, for example, from about 10 hours to about 40 hours.

After this heat-treatment, the catalyst may be optionally subjected to a further treatment by heating in aqueous nitric or hydrochloric acid at about 100° C. The time of heating is not critical and may, for example, vary between about ten minutes and six hours. A period of about three hours is preferred. The catalyst is then washed with water and dried at about 110° prior to use.

The catalyst may, if desired, be deposited on supports such as pumice, silica, carborundum or titania.

The oxide compositions of the present invention may be employed to catalyse various oxidation reactions of organic compounds, for example, the oxidation of propylene to acrolein, isobutene to methacrolein, the conversion of propylene and/or acrolein to acrylonitrile and of isobutene and/or methacrolein to methacrylonitrile in the presence of ammonia and molecular oxygen, the conversion of n-butene to butadiene.

Use of the oxide compositions of the present invention as catalysts for various oxidation reactions of organic compounds is further illustrated with reference to the following examples.

EXAMPLE 1

19.8 parts by weight of powdered tin were added to a stirred solution of 118 parts by weight of nitric acid (S.G.=1.42) in 333 parts by weight of water at 95–100° C. Concurrently, 81.2 parts by weight of antimony powder were added to 473 parts of nitric acid (S.G.=1.42) at 95–100° C.

When the additions were completed, the suspensions were heated at their boiling points for 10 minutes and then mixed. The mixture was heated for a further 15 minutes, cooled to below 40° C. and filtered. The filter cake was washed by resuspension in 333 parts by weight of water at room temperature for 15 minutes, filtered, boiled in 333 parts by weight of water for one hour, cooled to below 40° C. and filtered. The filter cake was finally washed by resuspension in 333 parts by weight of water at room temperature for 15 minutes and filtered.

The filter cake was impregnated with a solution of 22.4 parts by weight of copper nitrate trihydrate in 30 parts by weight of water. The slurry was stirred to dryness at 100° C., the residue dried at 120° C. for 16 hours and pelleted with the addition of 1% by weight of graphite.

The catalyst was heated at 800° C. for 16 hours in a stream of air, the temperature of the furnace being raised from 300° C. to 800° C. at 20° C. per hour.

A mixture of, by volume, 5% propylene, 6% ammonia, 55% air and 34% steam was passed over a bed of the catalyst in a reactor at 490° C. The contact time was 4 seconds.

Of the propylene fed to the reactor, 62% was converted to acrylonitrile, 3% to acrolein and 13% to carbon dioxide.

100 parts by weight of the catalyst was heated for 3 hours under reflux with a solution of 177 parts by weight of nitric acid (S.G.=1.42) in 125 parts by weight of water. The catalyst was filtered, washed with water and dried at 120° C. for 16 hours.

From the same gaseous feed under the same reaction conditions, the yields, based on propylene fed were: 67% acrylonitrile, 2% acrolein and 11% carbon dioxide.

EXAMPLE 2

The above catalyst preparation was repeated except that the washed tin/antimony oxides were impregnated with a solution of 50.3 parts by weight of copper nitrate trihydrate in 30 parts by weight of water.

A mixture of the same composition as in Example 1 was passed over a bed of the catalyst in a reactor at 460° C. The contact time was 4 seconds.

Of the propylene fed to the reactor, 44% was converted to acrylonitrile, 1.5% to acrolein and 27% to carbon dioxide.

The catalyst was digested with nitric acid as described in Example 1 and dried at 110°.

A mixture of the same composition as in Example 1 was passed over the acid-extracted catalyst at 460° C. and 4 seconds contact time. The yield of acrylonitrile had increased to 63% based on propylene fed.

EXAMPLE 3

A mixture of the hydrated tin and antimony oxides, prepared as described in Example 1, was impregnated with a solution of 9.9 parts by weight of copper formate, $Cu(COOH)_2 4H_2O$ in 40 parts by weight of water at 50° C. The excess water was evaporated from the well stirred slurry, the residue dried at 120° for 16 hours and pelleted in admixture with 1% by weight of graphite.

The catalyst was heated at 800° C. for 16 hours in a stream of air, the temperature of the furnace being raised from 100° C. to 800° C. at 20° C. per hour.

A mixture of propylene, ammonia, air and steam of the same composition as in Example 1 was passed over the catalyst at 470° C. and 4 seconds contact time.

Of the propylene fed to the reactor, 69% was converted to acrylonitrile, 2% to acrolein and 10% to carbon dioxide.

EXAMPLE 4

29.7 parts by weight of powdered tin were added to a stirred solution of 178 parts by weight of nitric acid (S.G.=1.42) in 250 parts by weight of water, at 95° C. When the addition was completed 710 parts by weight of nitric acid (S.G.=1.42) were added, and the temperature of the suspension raised to 95° C. and 121.8 parts by weight of antimony powder added. The stirred mixture was heated at boiling point for a further 15 minutes, cooled to below 40° C. and filtered.

The filter cake was washed by resuspension in 1000 parts by weight of water at room temperature for 15 minutes, filtered, again washed by resuspension in 1000 parts by weight of boiling water for one hour, cooled to below 40° C. and filtered. The filter cake was finally resuspended in 1000 parts by weight of water at room temperature for 15 minutes and filtered.

The filter cake was stirred for one hour with a solution of 28.2 parts by weight of copper formate $$Cu(COOH)_2 4H_2O$$

in 53 parts by weight of 8 N aqueous ammonia. The excess solution was filtered, the filter cake dried at 120° C. for 16 hours and pelleted in admixture with 1% graphite.

The catalyst was heated at 800° C. for 16 hours in a stream of air, the temperature of the furnace being raised from 150° C. to 800° C. at 20° C. per hour. The resulting catalyst contained 3% of copper.

A mixture of, by volume, 5% propylene, 6% ammonia, 55% air and 34% steam was passed over a bed of the catalyst in a reactor at 490° C. The contact time was 4 seconds.

Of the propylene fed to the reactor, 68% was converted to acrylonitrile, 2.5% to acrolein and 10.5% to carbon dioxide.

EXAMPLE 5

Aqueous ammonia, 1.3 N was added to a stirred solution of 3.05 parts by weight of copper nitrate trihydrate in 100 parts by weight of water until the pH of the solution was 7.3. The precipitated copper hydroxide was filtered, washed with water on the filter and resuspended in 100 parts by weight of water.

The suspension was added to a mixture of hydrated tin and antimony oxides prepared as described in Example 4, also suspended in 100 parts by weight of water. The mixture was vigorously stirred for one hour at room temperature and filtered. The filter cake was dried at 120° C. for 16 hours and pelleted in admixture with 1% graphite.

The catalyst was heated at 800° C. for 16 hours in a stream of air, the temperature of the furnace being raised from 300° C. to 800° C. at 20° C. per hour.

A gaseous mixture of the same composition as was used in Example 1 was passed over a bed of the catalyst in a reactor at 480° C. The contact time was 4 seconds.

Of the propylene fed to the reactor, 71% was converted to acrylonitrile, 1.5% to acrolein and 10.5% to carbon dioxide.

EXAMPLE 6

59.4 parts by weight of powered tin were added to a stirred solution of 355 parts by weight of nitric acid (S.G.=1.42) in 500 parts by weight of water, at 95° C. When the addition was completed 710 parts by weight of nitric acid (S.G.=1.42) were added, the temperature of the suspension again raised to 95° C. and 121.8 parts by weight of antimony powder added. The stirred suspension was heated at boiling point for a further 15 minutes, cooled to below 40° C. and filtered.

The filter cake was washed as described in the previous examples, then impregnated with a solution of 28.2 parts by weight of copper formate $Cu(COOH)_2 4H_2O$ in 40 parts by weight of 5% formic acid, at 60° C. The excess water was evaporated from the well stirred slurry, the residue dried at 120° C. for 16 hours and pelleted in admixture with 1% graphite.

The catalyst was heated at 800° C. for 16 hours in a stream of air, the temperature of the furnace being raised from 300° C. to 800° C. at 20° C. per hour.

A mixture of, by volume, 5% propylene, 6% ammonia, 55% air and 34% steam was passed over a bed of the catalyst in a reactor at 470° C. The contact time was 4 seconds.

Of the propylene fed to the reactor, 70% was converted to acrylonitrile, 1.5% to acrolein and 11% to carbon dioxide.

EXAMPLE 7

130.3 parts by weight of stannic chloride were added to 2000 parts by weight of distilled water and 42.6 parts by weight of cupric chloride ($CuCl_2.2H_2O$) were added to the stirred mixture followed by the dropwise addition of 595 parts by weight of antimony pentachloride over a period of 40 minutes. After stirring for a further 70 minutes, 718 parts by weight of ammonia (S.G.=.880) was added to give a pH of 6.0.

The precipitate was filtered, washed twice by resuspension and stirred for 15 minutes in 2000 parts by weight distilled water, dried for 24 hours at 115° C. and finally pelleted.

The pellets were heat-treated from 200° C. to 800° C. at 23° C. per hour and 800° C. for 16 hours in a stream of air.

A gaseous mixture of propylene (5.0% by volume), ammonia (6.0% by volume), air (55.0% by volume) and steam (34.0% by volume) was passed over the catalyst at 460° C. and a contact time of 4 seconds (N.T.P.).

Of the propylene fed to the reactor, 71.5% was converted to acrylonitrile, 5% to hydrogen cyanide and 11% to carbon dioxide. The efficiency of conversion of propylene to acrylonitrile was 74%.

EXAMPLE 8

A catalyst containing tin, antimony and copper oxides in the molar ratios Sn:Sb:Cu=1:4:0.5 was prepared as follows:

To a solution of copper nitrate trihydrate (600 parts by weight) in a mixture of nitric acid (d. 1.42; 355 parts by weight) and water (250 parts by weight), stirred and heated at 80-90° C. powdered tin (59.3 parts by weight) was added over a period of 15 minutes. Concentrated nitric acid (d. 1.42, 1420 parts by weight) and copper nitrate trihydrate (700 parts by weight) were then added, the mixture re-heated to 90-100° C., and powdered antimony (243.5 parts by weight) added during 20 minutes. The mixture was boiled for 20 minutes, cooled and filtered at 40° C. The precipitate was resuspended in cold water (250 parts by weight), stirred for 15 minutes and filtered, then boiled with water (600 parts by weight) for 20 minutes, filtered and the filter cake dried in the oven at 110° C. The dried cake was milled in a roller-mill for 30 minutes with the addition of 1% of its weight of graphite, pelleted and heat-treated at 800° C. for 16 hours, the furnace temperature being raised from 100 to 800° C. at 20° C. per hour.

The pellets were heated at 100° C. in three times their weight of 35% nitric acid for 3 hours, washed and dried at 110° C.

A gaseous feed with the molar composition 5% propylene, 6% ammonia, 55% air and 34% steam feed over this catalyst at 480° C. and 4 seconds contact time (calculated at N.T.P.) yielded 71% acrylonitrile, 2% acrolein and 14% $CO_2$, based on the propylene fed to the reactor. The efficiency of conversion of propylene to acrylonitrile and acrolein (taken together) was 76%.

EXAMPLE 9

A portion of the heat-treated catalyst prepared as described in Example 8, 37.7 parts by weight, were heated in boiling nitric acid solution (118 parts by weight of aqueous 40% nitric acid) for three hours, washed well with distilled water and dried.

A gaseous mixture of 5% v./v. propylene, 6% v./v. ammonia, 55% v./v. air and 34% v./v. steam was passed over a bed of catalyst in an isothermal reactor maintained at 460° C. The contact time was 4 seconds.

Of the propylene fed to the reactor, 73.4% was converted to acrylonitrile, 1.1% to acrolein, 4.8% to hydrogen cyanide and 9.7% to carbon dioxide.

EXAMPLE 10

A washed tin oxide/antimony oxide mixture, prepared as described in Example 10 was suspended in water (500 parts by weight), and a solution of cupric nitrate trihydrate ($Cu(NO_3)_2 3H_2O$) (30.2 parts by weight) and ferric nitrate nonahydrate ($Fe(NO_3)_3 9H_2O$) (50.5 parts by weight) in water (50 parts by weight) added. The mixture was stirred for 15 minutes at 20° C. and then neutralised to pH 7.1 by the dropwise addition of aqueous ammonia (84.6 parts by weight), prepared by mixing equal volumes of concentrated ammonia (S.G.=0.88) and water.

The resultant catalyst was filtered off, washed twice by re-suspension in water (2000 parts by weight) and dried at 110° C. for 16 hours. The dried powder was formed into tablets and heated at 850° C. for 16 hours; the temperature of the furnace being raised from 300° C. to 850° C. at a rate of 20° C. per hour.

A mixture of, by volume, 5% of propylene, 6% of ammonia, 34% of steam and 55% of air was passed over a fixed bed of the catalyst at 479° C. The contact time was 4 seconds.

Of the propylene fed to the reactor, 67.8% was converted to acrylonitrile and 2.1% to acrolein. 5.1% of the propylene fed was recovered.

EXAMPLE 11

A solution of chromic nitrate ($Cr(NO_3)_3 9H_2O$) (50 parts by weight) in water (100 parts by weight) was added to a suspension of the washed tin/antimony oxides (prepared as in Example 10) in water (400 parts by weight) and the mixture stirred for 15 minutes. The pH of the mixture was adjusted to 7 by the dropwise addition of 8 N ammonia. The green precipitate was filtered off, washed by re-suspension in water (500 parts by weight) for 15 minutes, filtered and dried at 110° C. for 16 hours. The dried powder was pelleted in admixture with 1% graphite and the pellets heated at 800° C. for 16 hours in a stream of air; the temperature of the furnace being raised from 300° C. to 800° C. at 20° C. per hour.

A mixture by volume, 5% propylene, 6% ammonia, 55% air and 34% steam was passed over a bed of the catalyst in a reactor at 480° C. The contact time was 4 seconds.

Of the propylene fed to the reactor, 62.7% was converted to acrylonitrile, 13.4% to carbon dioxide and 5% was recovered.

EXAMPLE 12

2186.3 parts by weight of antimony trioxide were added to a stirred solution of 2662 parts by weight of nitric acid (S.G.=1.42) in 7500 parts by weight of water at 95° C. Subsequently 445.5 parts by weight of powdered tin were added to the stirred suspension at 95-100° C. When the addition was completed, the mixture was heated at boiling point for a further 15 minutes, cooled to below 40° C. and filtered. The filter cake was washed by re-suspension in 10,000 parts by weight of water, at room temperature, for 15 minutes.

The filter cake was suspended in 6500 parts by weight of water and a solution of copper nitrate

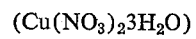

$(Cu(NO_3)_2 3H_2O)$ 226.5 parts by weight in water, 1880 parts by weight, was added. The mixture was stirred at 50° C. for 15 minutes and neutralized by the dropwise addition of 4 N aqueous ammonia. The suspension, pH=6.9, was cooled to room temperature and filtered. The filter cake was washed by resuspension in 10,000 parts by weight of water, at room temperature, for 15 minutes. The filter cake was dried at 110° C. for 64 hours and pelleted in admixture with 1% graphite.

The catalyst was heated at 800° C. for 16 hours in a stream of air, the temperature of the furnace being raised from 200° C. to 800° C. at 20° C. per hour.

A mixture of, by volume, 5% propylene, 6% ammonia, 55% air and 34% steam was passed over a bed of the catalyst in a reactor at 480° C. The contact time was 4 seconds.

Of the propylene fed to the reactor, 70% was converted into acrylonitrile, 2.5% to acrolein and 9% to carbon dioxide.

A mixture of, by volume, 6% propylene, 7% ammonia, 60% air and 27% steam was passed over a bed of the catalyst in a reactor at 465° C. The contact time was 4 seconds.

Of the propylene fed to the reactor, 68% was converted into acrylonitrile, 2% to acrolein and 7% to carbon dioxide.

A mixture of, by volume, 6% propylene, 6% ammonia, 60% air and 28% steam, was passed over the catalyst at 462° C. The contact time was 4 seconds.

Of the propylene fed to the reactor, 66% was converted into acrylonitrile, 3% to acrolein and 7.5% to carbon dioxide.

A mixture of, by volume, 6% propylene, 5% ammonia, 60% air and 29% steam was passed over the catalyst at 465° C. The contact time was 4 seconds.

Of the propylene fed to the reactor, 60.5 was converted into acrylonitrile, 6% to acrolein and 9% to carbon dioxide.

EXAMPLE 13

Tin powder (59.4 parts by weight) was added slowly to a stirred solution of concentrated nitric acid (355 parts by weight) and water (500 parts by weight) at 90° C. Concentrated nitric acid (1400 parts by weight) was added, the temperature raised to 95° C. and antimony powder (243.5 parts by weight) added slowly. The mixture was stirred at 100° C. for a further 15 minutes, cooled to 40° C. and filtered.

The filter cake was washed by resuspension in water (2000 parts by weight) for 15 minutes, filtered, resuspended in boiling water (2000 parts by weight) for 1 hour, filtered and finally resuspended in water (2000 parts by weight) for 15 minutes and filtered.

The filter cake was resuspended in water (450 parts by weight), a solution of manganous chloride, $MnCl_2 \cdot 4H_2O$, (49.4 parts by weight) in water (50 parts by weight) added and the mixture stirred for 15 minutes. Aqueous ammonia, consisting of a mixture of equal volumes of aqueous ammonia (density 0.880) and water, was added until the pH of the mixture reached 10.4.

The suspension was filtered and the filter cake was washed twice by resuspension in portions of water (1000 parts by weight) for 15 minute periods. The material was dried at 110° C., ground to <30 mesh, mixed with 1% w./w. graphite and pelleted (3 mm.). The pellets were heated to 850° C. in a stream of air; the temperature was raised at the rate of 21° C. per hour and then maintained at 850° C. for 16 hours.

A gaseous feed of 5% v./v. propylene, 6% v./v. ammonia, 34% v./v. steam and 55% v./v. air was fed over this catalyst at 480° C. and 4 seconds contact time. The yields of acrylonitrile, acrolein and carbon dioxide, based on the propylene fed, were 60%, 2% and 10% respectively. The efficiency of conversion of propylene to acrylonitrile was 66%.

EXAMPLE 14

A catalyst containing tin, antimony and copper oxides in the atomic ratio Sn:Sb:Cu=4:16:1 was prepared as described in Example 1, except that the catalyst was heat-treated to 910° C. and maintained at that temperature for 16 hours.

A feed of 10% propylene, 60% air and 40% steam was passed over the catalyst at 470° C. and 3.8 seconds nominal contact time. Of the propylene fed, 41.3% was converted to acrolein, 11% to oxides of carbon and 45.4% was recovered. The efficiency of conversion of propylene to acrolein was 75.5%.

EXAMPLE 15

A catalyst composed of tin, antimony and copper oxides prepared as described in Example 1, having an atomic ratio of 1:4:0.25 was packed into a laboratory isothermal reactor. At a temperature of 450° with a feed of butene-1 (10% v./v.), air (60% v./v.), and steam (30% v./v.) at a contact time of 4 seconds, a yield of 79.6% butadiene was obtained.

EXAMPLE 16

With the same flows in a similar reactor a commercial butene feed gave a yield of 64.9% butadiene at a temperature of 394° C. over a catalyst composed of tin, antimony and chromium oxides in the atomic ratio 1:4:0.25, prepared as described in Example 1, replacing copper by chromium.

We claim:
1. A catalytic composition for catalyzing oxidation reactions of organic compounds at an elevated temperature in the vapor phase which consists of an oxide composition of antimony and tin together with copper, wherein the atomic ratio of antimony to tin is within the range of 1:10 to 10:1 and the copper content is between 0.5 and 30% molar based on the total catalytic composition.

2. A composition as claimed in claim 1, wherein the atomic ratio of antimony to tin is between about 6:1 and 2:1 and the amount of copper present in the composition is between 1 and 15% molar based on the total composition.

3. A composition as claimed in claim 1, heated before use to a temperature in the range 550° to 1100° C. in a molecular oxygen containing gas.

4. A composition as claimed in claim 3, heated at a controlled rate of 5 to 50° C. per hour to a temperature in the range of 700 to 850° C.

5. A composition as claimed in claim 1, deposited on a support material selected from the group consisting of pumice, silica, carborundum and titania.

References Cited

UNITED STATES PATENTS

| | | | |
|---|---|---|---|
| 3,341,471 | 9/1967 | Callahan et al. | 252—469 |
| 2,670,381 | 2/1954 | Hadley et al. | 252—463 |
| 2,847,475 | 8/1958 | Voge et al. | 252—463 |
| 3,149,914 | 9/1964 | Bellringer et al. | 252—464 |
| 3,200,081 | 8/1965 | Callahan et al. | 252—443 |

OSCAR R. VERTIZ, Primary Examiner

H. S. MILLER, Assistant Examiner

U.S. Cl. X.R.
252—454, 456